US008345138B2

(12) United States Patent  
Yanada et al.

(10) Patent No.: US 8,345,138 B2  
(45) Date of Patent: Jan. 1, 2013

(54) IMAGING APPARATUS

(75) Inventors: Takashi Yanada, Hachioji (JP); Akira Ueno, Hachioji (JP)

(73) Assignee: Olympus Corportion, Tokyo (JP)

( * ) Notice: Subject to any disclaimer, the term of this patent is extended or adjusted under 35 U.S.C. 154(b) by 356 days.

(21) Appl. No.: 12/709,600

(22) Filed: Feb. 22, 2010

(65) Prior Publication Data

US 2010/0231742 A1    Sep. 16, 2010

(30) Foreign Application Priority Data

Mar. 13, 2009    (JP) ................ 2009-061930

(51) Int. Cl.  
    *H04N 3/14*    (2006.01)  
    *H04N 5/228*    (2006.01)  
    *H04N 5/04*    (2006.01)  
    *H04L 12/50*    (2006.01)  
    *G03B 9/70*    (2006.01)

(52) U.S. Cl. ............ 348/312; 348/222.1; 348/500; 348/221.1; 370/366; 396/180

(58) Field of Classification Search ........... 348/222.1, 348/221.1, 229.1, 362–371, 194, 425.4, 500, 348/521, 423.1, 501, 312; 396/61, 171–180; 370/441, 366, 304, 324, 350, 503, 395.62; 710/1, 71, 65  
See application file for complete search history.

(56) References Cited

U.S. PATENT DOCUMENTS

| | | | | |
|---|---|---|---|---|
| 6,515,271 | B1* | 2/2003 | Shimizu .............. | 250/208.1 |
| 6,654,065 | B1* | 11/2003 | Sung .................. | 348/525 |
| 7,443,426 | B2* | 10/2008 | Endo .................. | 348/222.1 |
| 2009/0244303 | A1* | 10/2009 | Kinoshita et al. ........ | 348/222.1 |

FOREIGN PATENT DOCUMENTS

| | | |
|---|---|---|
| JP | 2-300731 | 12/1990 |
| JP | 2001-258014 | 9/2001 |
| JP | 2001258014 | * 9/2001 |
| JP | 2007-53534 | 3/2007 |

OTHER PUBLICATIONS

Notification of the First Office Action for Chinese Patent Application No. 201010117400.2, Nov. 3, 2011 (4 pgs.) with translation (8 pgs.).

* cited by examiner

*Primary Examiner* — Nhan T Tran  
*Assistant Examiner* — Marly Camargo  
(74) *Attorney, Agent, or Firm* — John C. Pokotylo; Straub & Pokotylo

(57) ABSTRACT

An imaging apparatus includes an imaging element, an image signal transmitter, an image signal receiver, a signal processor and a control unit. The imaging element includes pixels arranged in two-dimensional array. The pixels output an imaging signal in synchronization with a first synchronizing signal. The image signal transmitter superimposes a second synchronizing signal on the imaging signal and transmits an image signal. The second synchronizing signal indicates a start position in vertical and horizontal directions in the two-dimensional array and is different from the first synchronizing signal. The image signal receiver receives the image signal from the image signal transmitter, and separates the received image signal into the imaging signal and second synchronizing signal. The signal processor processes the separated imaging signal based on the separated second synchronizing signal. The control unit receives the first synchronizing signal, and controls peripheral circuits in synchronization with the first synchronizing signal.

5 Claims, 4 Drawing Sheets

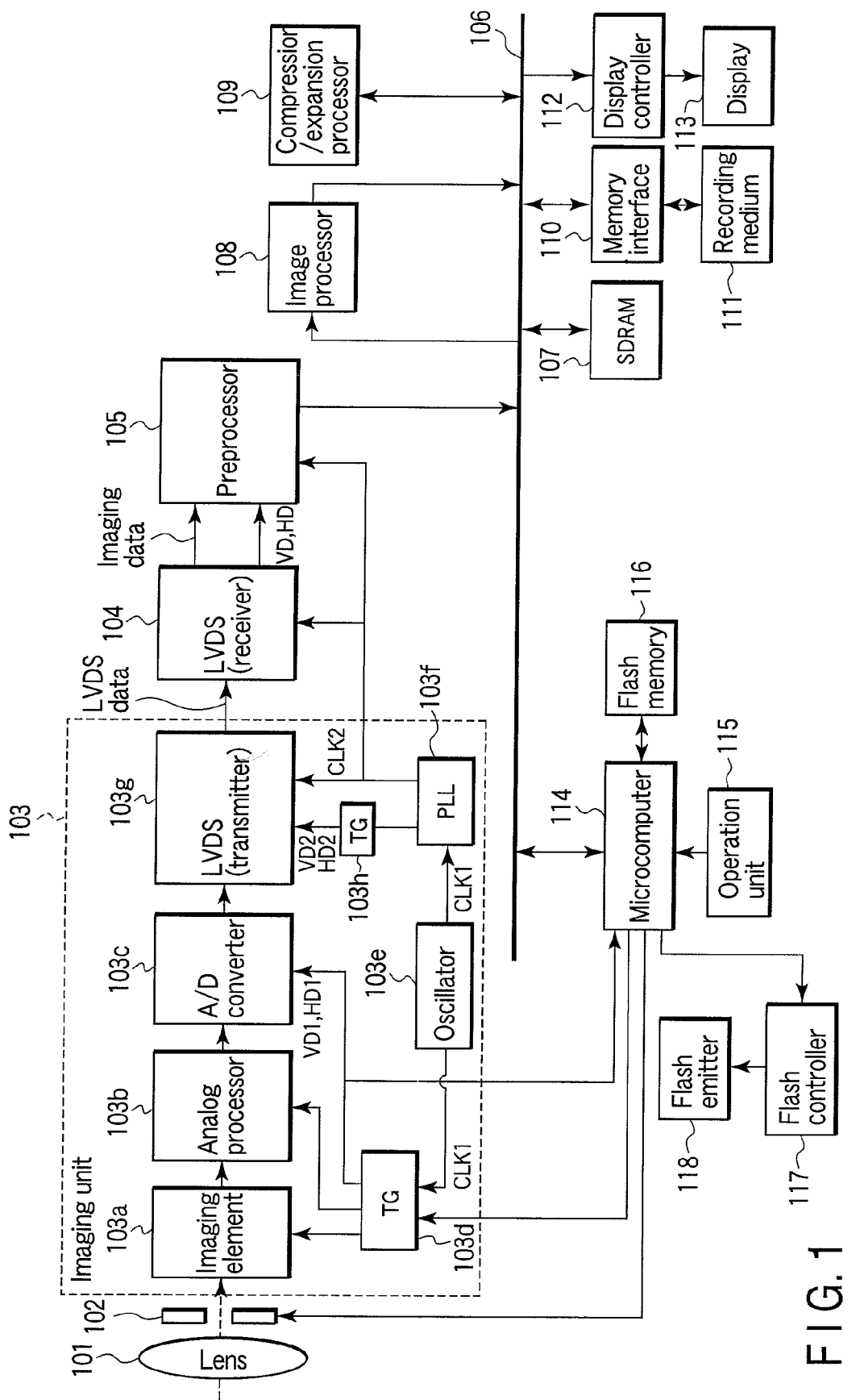
F I G. 1

IMAGING APPARATUS

CROSS-REFERENCE TO RELATED APPLICATIONS

This application is based upon and claims the benefit of priority from prior Japanese Patent Application No. 2009-061930, filed Mar. 13, 2009, the entire contents of which are incorporated herein by reference.

BACKGROUND OF THE INVENTION

1. Field of the Invention

The present invention relates to an imaging apparatus having an imaging unit, which converts an imaging signal and synchronizing signal into serial data, and transmits the serial data.

2. Description of the Related Art

In recent years, various techniques have been proposed for increasing the speed of transmitting an image signal obtained by an imaging unit having an imaging element, and reducing the dimensions of an imaging apparatus. In particular, various techniques, which convert an imaging signal and synchronizing signal input as parallel data through an imaging element into serial data, and transmit the serial data, have been proposed. Low voltage differential signaling (LVDS) technique is one of the serial data transmitting techniques. As an example of data transmission using the LVDS technique, Jpn. Apt. Appln. KOKAI Publication No. 2001-258014 discloses a technique, which multiplexes a reference clock signal, a synchronizing signal, and a data signal from an interface control unit by using a LVDS transmission clock obtained from a LVDS transmission clock generator, and transmits the LVDS signal through less number of signal lines. In the technique disclosed in Jpn. Apt. Appln. KOKAI Publication No. 2001-258014, a LVDS transmission clock is converted into a pair of LVDS signals, and the converted LVDS signal is transmitted. A LVDS receiver decompresses a multiplexed LVDS signal sent from a LVDS transmitter by using a LVDS transmission clock sent from a LVDS transmitter, and sends the decompressed signal to an interface control unit. According to the technique of Jpn. Apt. Appln. KOKAI Publication No. 2001-258014, high speed signal transmission is possible by using the LVDS technique.

Further, Jpn. Apt. Appln. KOKAI Publication No. 2007-53534 discloses a technique, which controls the light-emitting timing of a flash unit by counting the number of horizontal synchronizing signals synchronous with the operation of an imaging element, in order to synchronize the operations of a flash unit and an electronic shutter of an imaging element.

BRIEF SUMMARY OF THE INVENTION

According to a first aspect of the invention, there is provided an imaging apparatus comprising: an imaging element which includes pixels arranged in two-dimensional array, the pixels outputting an imaging signal in synchronization with a first synchronizing signal; an image signal transmitter which superimposes a second synchronizing signal on the imaging signal and transmits an image signal obtained by a superimposition, the second synchronizing signal indicating a start position in vertical and horizontal directions in the two-dimensional array and being different from the first synchronizing signal; an image signal receiver which receives the image signal transmitted from the image signal transmitter, and separates the received image signal into the imaging signal and second synchronizing signal; a signal processor which processes the separated imaging signal based on the separated second synchronizing signal; and a control unit which receives the first synchronizing signal, and controls peripheral circuits in synchronization with the first synchronizing signal.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of an example of an imaging apparatus according to an embodiment of the invention;

DETAILED DESCRIPTION OF THE INVENTION

Figure 2:
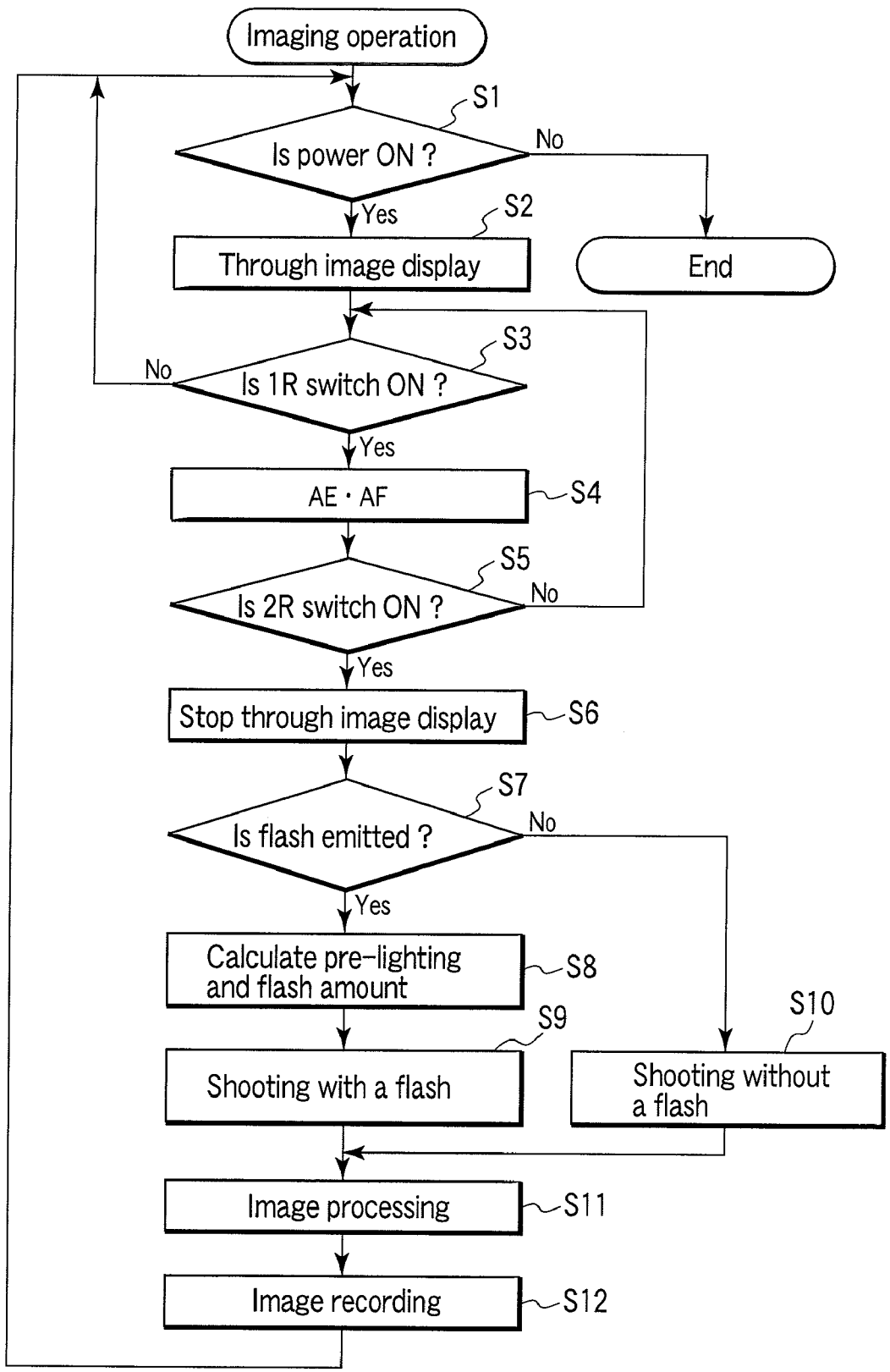
FIG. 2 is a flowchart of shooting operation of the imaging apparatus shown in FIG. 1.

An embodiment of the invention will be explained with reference to the accompanying drawings.

FIG. 1 is a block diagram of an example of an imaging apparatus according to an embodiment of the invention. The imaging apparatus shown in FIG. 1 includes a lens 101, a shutter diaphragm 102, an imaging unit 103, a LVDS receiver 104, a preprocessor 105, a bus 106, a SDRAM 107, an image processor 108, a compression/expansion processor 109, a memory interface 110, a recording medium 111, a display controller 112, a display 113, a microcomputer 114, an operation unit 115, a flash memory 116, a flash controller 117, and a flash emitter 118.

The lens 101 focuses an optical image of a subject on an imaging element 103a in the imaging unit 103. The shutter diaphragm 102 is provided close to the lens 101. The shutter diaphragm 102 functions also as a shutter, which adjusts the amount of light entering the imaging element 103a from the lens 101 (the exposure of the imaging element 103a). The shutter and diaphragm may be provided as separate parts.

The imaging unit 103 includes an imaging element 103a, an analog processor 103b, an analog-digital converter (A/D) 103c, a timing generator (TG) 103d, an oscillator 103e, a PLL 103f, a LVDS transmitter 103g, and a timing generator (TG) 103h.

The imaging element 103a has a light-receiving surface, which is composed of photoelectric conversion elements such as photodiodes arranged in two dimensions, converts the light condensed by the lens 101 into an electric signal (an imaging signal), and outputs the converted imaging signal to the preprocessor 105. The imaging element 103a may be either CMOS or CCD type.

Here, the imaging element 103a recognizes start of processing of an imaging signal output from a pixel corresponding to a vertical start position (e.g., the upper left end) in the imaging element 103e, by the input of a vertical synchronizing signal VD1 from the TG 103d. After the vertical synchronizing signal VD1 is input, whenever a horizontal synchronizing signal HD1 is input from the TG 103d, the imaging element 103a performs processing of the imaging signal output in order from a pixel corresponding to a horizontal start position (e.g., the left end column) by the predetermined amount (e.g., equivalent to one line).

The analog processor 103b performs analog processing, such as AGC processing, which adjusts the amplitude of the imaging signal output from the imaging element 103a by the predetermined amount, to the dynamic range of the analog-digital converter 103c, in synchronization with the vertical synchronizing signal VD1 and horizontal synchronizing signal HD1. The analog-digital converter 103c converts the imaging signal output from the analog processor 103b by the predetermined amount, into a digital imaging signal (hereinafter, called imaging data), in synchronization with the vertical synchronizing signal VD1 and horizontal synchronizing signal HD1. The analog-digital converter 103c outputs the converted imaging data to the LVDS transmitter 103g.

The TG 103d generates a vertical synchronizing signal VD1 and horizontal synchronizing signal HD1 (a first synchronizing signal), and outputs the generated vertical synchronizing signal VD1 and horizontal synchronizing signal HD1 to the analog-digital converter 103c. Further, in this embodiment, the TG 103d outputs the vertical synchronizing signal VD1 and horizontal synchronizing signal HD1 to the microcomputer 114. The vertical synchronizing signal VD1 and horizontal synchronizing signal HD1 are output to the microcomputer 114 irrespective of the operating states of the imaging element 103a.

The TG 103h generates a vertical synchronizing signal VD2 and horizontal synchronizing signal HD2 (a second synchronizing signal), which synchronizes with a clock signal CLK2 faster than a clock signal CLK1, and outputs the generated vertical synchronizing signal. VD2 and horizontal synchronizing signal HD2 to the LVDS transmitter 103g.

The oscillator 103e generates a reference clock signal CLK1 having a predetermined frequency, and outputs the generated clock signal CLK1 to the TG 103d, TG 103h and PLL 103f.

The phase-locked loop (PLL) 103f generates a clock signal CLK2 for LVDS transmission, which is higher in speed and accuracy than the clock signal CLK1, and outputs the generated clock signal CLK2 to the LVDS transmitter 103g, LVDS receiver 104, and preprocessor 105. Generally, in the data transfer using LVDS, data cannot be transferred unless an accurate high-speed clock signal higher than a certain frequency is used. In this embodiment, the PLL 103f is used for generating such a clock signal CLK2.

The low voltage differential signaling (LVDS) transmitter 103g, as an image signal transmitter, converts the imaging data, vertical synchronizing signal VD2 and horizontal synchronizing signal HD2 input from the analog converter 103c and PLL 103f as parallel data, into differential serial data (LVDS data), and transfers the LVDS data to the LVDS receiver 104. The LVDS data is formed as serial data with the synchronizing signals (vertical and horizontal) superimposed at the beginning of imaging data equivalent to a predetermined amount (one line). By forming the LVDS data as above, the vertical synchronizing signal VD2 and horizontal synchronizing signal HD2 can be separated from the LVDS data.

The LVDS receiver 104 having the function of an image signal receiver detects the vertical synchronizing signal VD2 and horizontal synchronizing signal HD2 in the LVDS data transferred from the LVDS transmitter 103a according to the clock signal CLK2, and separates the LVDS data into imaging data, vertical synchronizing signal VD2, and horizontal synchronizing signal HD2. The LVDS receiver 104 outputs the separated data as parallel data.

The preprocessor 105 having the function of a signal processor performs digital preprocessing such as shading correction for the imaging data decompressed by the LVDS receiver 104, and transfers the preprocessed imaging data to the SDRAM 107 through the bus 106. The preprocessor 105 performs the preprocessing in synchronization with the vertical synchronizing signal VD2 decompressed in the LVDS receiver 104, the horizontal synchronizing signal HD2, and the clock signal CLK2 input from the PLL 103f.

As described above, the clock signal CLK2 is faster than the reference clock signal CLK1 for operating the imaging element 103a. Therefore, the vertical synchronizing signal VD2 and horizontal signal HD2 have timing different from the vertical synchronizing signal VD1 and horizontal synchronizing signal HD1. When a reference position of the imaging data is determined by using the vertical synchronizing signal VD1 and horizontal synchronizing signal HD1, the reference position may be fluctuated by the influence of a metastable (the fact that an output signal becomes unstable when setup time or hold time exceeds predetermined time in an electronic circuit). Thus, the vertical synchronizing signal VD1 and horizontal synchronizing signal HD1 are not necessarily synchronized with the decompressed imaging data. On the other hand, the vertical synchronizing signal VD2 and horizontal synchronizing signal HD2 are synchronized with the decompressed imaging data. The preprocessor 105 performs the processing in synchronization with the vertical synchronizing signal. VD2, horizontal synchronizing signal HD2, and clock signal CLK2 input from the PLL 103f.

The bus 106 is a path for transferring data generated in the imaging apparatus to each block in the imaging apparatus. The bus 106 is connected to the preprocessor 105, SDRAM 107, image processor 108, compression/expansion processor 109, memory interface 110, display controller 112, and microcomputer 114.

The SDRAM 107 stores the imaging data processed by the preprocessor 105, and various data including imaging data processed by the image processor 108 and compression/expansion processor 109.

The image processor 108 performs image processing, such as white balance correction and noise reduction, for the image data read from the SDRAM 107 through the bus 106, and stores the processed imaging data in the SDRAM 107 through the bus 106. The image processor 108 performs the processing according to instructions from the microcomputer 114.

When the imaging data is recorded, the compression/expansion processor 109 reads the imaging data processed by the image processor 108 from the SDRAM 107 through the bus 106, and compresses the read image data to JPEG format, for example. When the imaging data is reproduced, the compression/expansion processor 109 reads the compressed imaging data recorded on the recording medium 111 from the SDRAM 107 through the bus 106, and expands the read image data.

The memory interface 110 controls reading and writing of the imaging data from/to the recording medium 111. The recording medium 111 is a memory card removable from the imaging apparatus, for example, and records the imaging data compressed by the compression/expansion processor 109.

The display controller 112 reads imaging data from the SDRAM 107, converts the data into a video signal, outputs the converted video signal to the display 113 to display an image. The display 113 is a TFT liquid crystal display, for example, and displays an image based on a video signal from the display controller 112.

The microcomputer 114 generally controls the sequences of a digital camera. The microcomputer 114 is connected to the operation unit 115 and flash memory 116. In displaying a through image or shooting a still image, as described later, the microcomputer 114 controls peripheral circuits of the imaging element 103*a* related to processing, according to the vertical synchronizing signal VD1 and horizontal synchronizing signal HD1.

The operation unit 115 includes operation members for the user to operate the imaging apparatus shown in FIG. 1. When the user operates any one of the operation members of the control unit 115, the microcomputer 114 executes the sequence corresponding to the user's operation. The flash memory 116 stores parameters necessary for operating the imaging apparatus. The flash memory 116 stores programs to be executed by the microcomputer 114. The microcomputer 114 reads parameters necessary for executing each sequence from the flash memory 116, and executes each processing, according to the programs stored in the flash memory 116.

The flash controller 117 controls the lighting operation of the flash emitter 118 according to the instruction from the microcomputer 114. The flash controller 117 includes a capacitor for storing the energy required for lighting the flash emitter 118. Receiving the lighting instruction from the flash controller 117, the flash emitter 118 emits light by using the energy stored in the capacitor of the flash controller 117. The flash emitter 118 includes a light-emitting tube such as a xenon ($X_2$) lamp, and a reflector.

Hereinafter, the operation of the imaging apparatus shown in FIG. 1 will be explained. FIG. 2 is a flowchart of shooting operation of the imaging apparatus shown in FIG. 1. The microcomputer 114 controls the shooting operation.

In FIG. 2, the microcomputer 114 determines whether the imaging apparatus is turned on (step S1). If the imaging apparatus is turned off in step S1, the microcomputer 114 terminates the processing shown in FIG. 2. If the imaging apparatus is turned on in step S1, the microcomputer 114 displays a through image (also called a live view) (step S2). The through image display is a process of sequentially processing the imaging data obtained by continuously operating the imaging element 103*a*, and sequentially displaying an image on the display 113 based on the imaging data obtained through the imaging element 103*a*. As a through image is displayed on the display 113, the display 113 can be used as an electronic finder.

Figure 3:
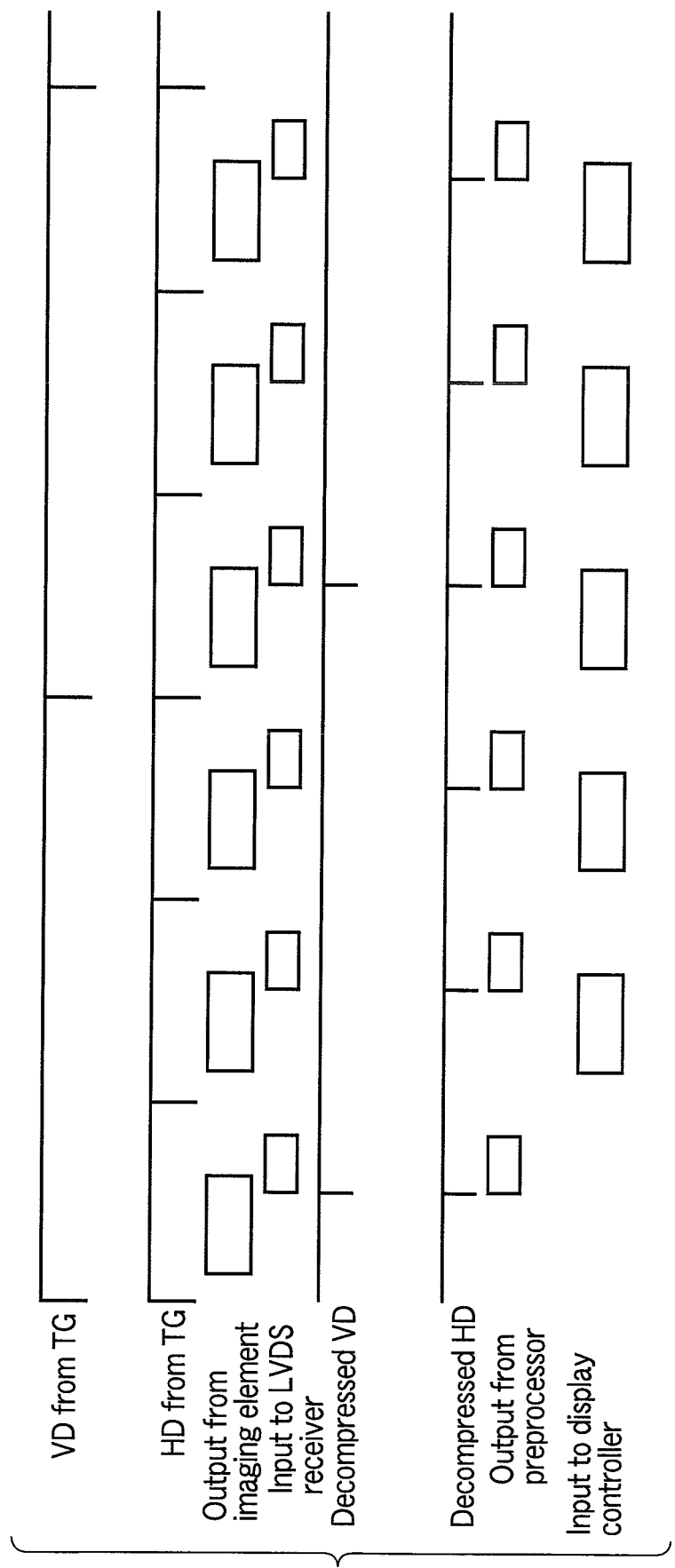
FIG. 3 is a timing chart of displaying a through image.

Generally, in the through image display, it is necessary to synchronize the imaging operation of the imaging element 103*a* with the displaying operation of the display 113. The imaging data, vertical synchronizing signal VD2, and horizontal synchronizing signal HD2 separated by the LVDS receiver 104 are synchronized with the clock signal CLK2. As described above, the clock signal CLK2 is a high-speed clock compared with the clock signal CLK1. In this case, as shown in FIG. 3, the timing of the vertical synchronizing signal VD1 and horizontal synchronizing signal HD1 is different from that of the vertical synchronizing signal VD2 and horizontal synchronizing signal HD2. The vertical synchronizing signal VD2 and horizontal synchronizing signal HD2 are synchronized with the imaging data separated by the LVDS receiver 104, but not necessarily synchronized with the vertical synchronizing signal VD1 and horizontal synchronizing signal HD1, that is, the operation of the imaging element 103*a*.

In this embodiment, the vertical synchronizing signal VD1 and horizontal synchronizing signal HD1 generated by the TG 103*d* are input to the microcomputer 114. The microcomputer 114 makes the image processor to execute image processing at the timing synchronous to the vertical synchronizing signal VD1 and horizontal synchronizing signal HD1, and makes the display controller 112 to execute image displaying. Therefore, even if the LVDS is used for transferring imaging data, the operations of the imaging element 103*a* and display 113 can be synchronized, and a correct through image can be always displayed.

After displaying a through image, the microcomputer 114 determines whether the user presses the release button of the operation unit 115 halfway, and a 1R switch is turned on (step S3). If the 1R switch is not turned on in step S3, the process is returned to step S1. In this case, the microcomputer 114 determines again whether the imaging apparatus is turned on. On the other hand, if the 1R switch is turned on in step S3, the microcomputer 114 executes AE processing and AF processing (step S4). In the AE processing, the microcomputer 114 calculates subject brightness from the imaging data stored in the SDRAM 107, and calculates exposure of the imaging element 103*a* on shooting a still image from the subject brightness. The microcomputer 114 determines whether a flash is necessary for shooting a still image, from the subject brightness. Further, in the AF processing, the microcomputer 114 calculates an AF evaluated value from the imaging data stored in the SDRAM 107, and adjusts the focus of the lens 101 so that the image of a subject focused on the imaging element 103*a* is the clearest. Exclusive sensors may be used for the AE processing and AF processing.

Next, the microcomputer 114 determines whether the release button is pressed all the way down by the user, and a 2R switch is turned on (step S5). If the 2R switch is not turned on in step S5, the process is returned to step S3. In this case, the microcomputer 114 determines whether the 1R switch is held on.

On the other hand, if the 2R switch is turned on in step S5, the microcomputer 114 stops display of a through image (step S6). Then, the microcomputer determines whether it is necessary to flash the flash emitter 118 (step S7). The flash emitter 118 flashes, when the subject brightness obtained by the AE processing in step S4 is low or the user instructs to flash.

Figure 4:
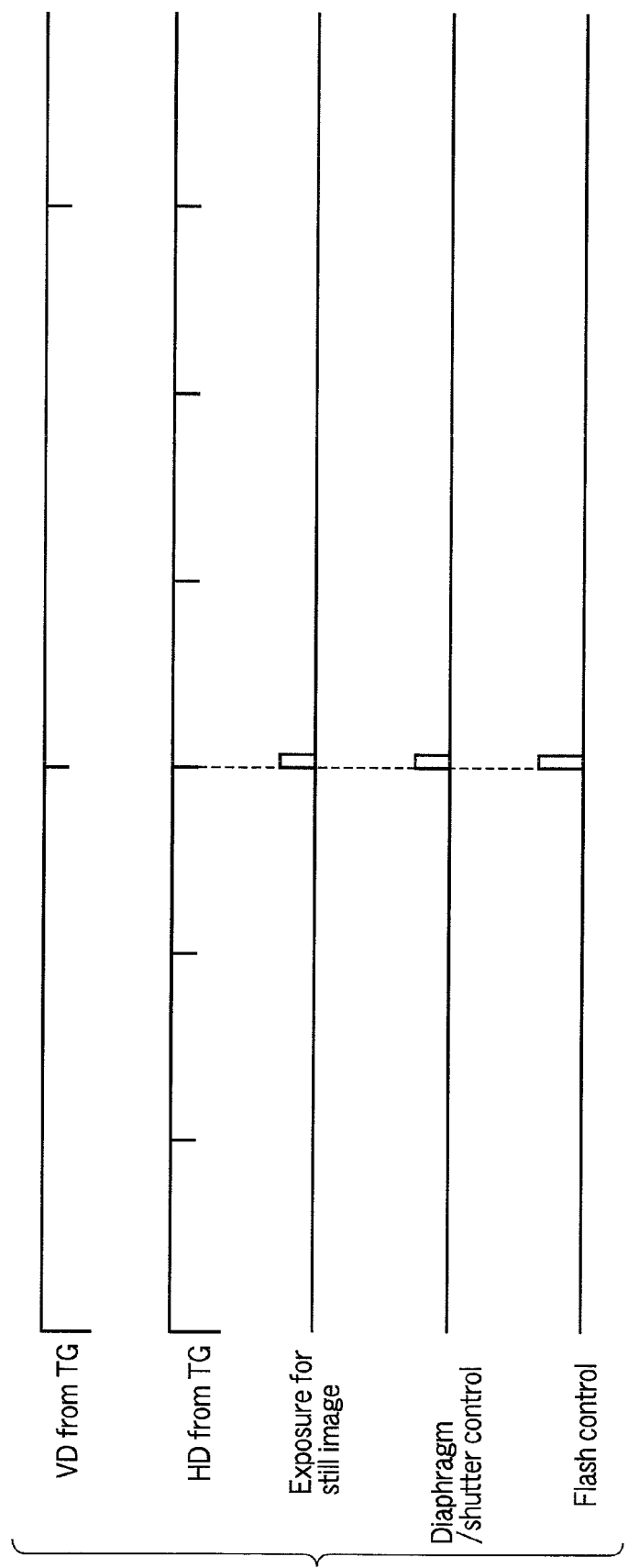
FIG. 4 is a timing chart of shooting a still image with a flash.

If it is necessary to flash in step S7, the microcomputer 114 controls the flash controller 117 to execute pre-lighting, in which the flash emitter 118 flashes by predetermined small light quantity, and calculates the light quantity of the flash emitter 118 when shooting a still image, by measuring the reflected light of the pre-lighting (step S8). After calculating the light quantity of the flash emitter 118, the microcomputer 114 controls the flash controller 117 to flash the flash emitter 118, and controls the shutter diaphragm 102 to control the exposure of the imaging element 103*a*, and makes the imaging element 103*a* to expose for a still image (step S9). FIG. 4 shows a timing chart of shooting a still image with a flash. In this embodiment, the vertical synchronizing signal VD1 and horizontal synchronizing signal HD1 generated in the TG 103*d* are input to the microcomputer 114. The microcomputer 114 can synchronize the operations of the imaging element 103*a*, shutter diaphragm 102, and flash emitter 118 on shooting a still image, by counting the horizontal synchronizing signal HD1.

If a flash is unnecessary in step S7, the microcomputer 114 controls the shutter diaphragm to control the exposure of the imaging element 103*a*, and makes the imaging element 103*a* to expose for a still image (step S10). At this time, the microcomputer 114 can synchronize the operations of the imaging element 103a and shutter diaphragm 102 on shooting a still image, by counting the horizontal synchronizing signal HD1.

After shooting a still image, the microcomputer 114 makes the image processor 108 to process the imaging data stored in the SDRAM 107 obtained by the still image exposure (step S11). Finally, after the image processor 108 performs image processing, the microcomputer 114 makes the compression/expansion processor 109 to perform compression processing for the imaging data stored in the SDRAM 107, and records the compressed imaging data obtained by the compression processing on the recording medium 111 (step S12). Then, the process is returned to step S1.

As explained above, according to this embodiment, as the vertical synchronizing signal VD1 and horizontal synchronizing signal HD1 for driving the imaging element 103a are input from the TG 103d of the imaging unit 103 to the microcomputer 114, even if the imaging element 103a is not operating and the LVDS receiver 104 does not receive a synchronizing signal, or the operation mode of the imaging element 103a is suddenly changed, the operation of the imaging element 103a can be synchronized with the operations of the peripheral circuits, which are required to synchronize with the operation of the imaging element 103a.

In the example of this embodiment described above, only the vertical synchronizing signal VD1 and horizontal synchronizing signal HD1 are sent to the microcomputer 114. However, the clock signal CLK1 may be sent to the microcomputer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging element which includes pixels arranged in two-dimensional array, the pixels outputting an imaging signal in synchronization with a first synchronizing signal;
   an image signal transmitter which superimposes a second synchronizing signal on the imaging signal and transmits an image signal obtained by a superimposition, the second synchronizing signal indicating a start position in vertical and horizontal directions in the two-dimensional array and being different from the first synchronizing signal;
   an image signal receiver which receives the image signal transmitted from the image signal transmitter, and separates the received image signal into the imaging signal and second synchronizing signal;
   a signal processor which processes the separated imaging signal based on the separated second synchronizing signal; and
   a control unit which receives the first synchronizing signal, and controls peripheral circuits in synchronization with the first synchronizing signal,
   wherein the imaging signal and second synchronizing signal are input to the image signal transmitter as parallel data,
   wherein the image signal transmitter performs the superimposition to convert the imaging signal and second synchronizing signal to a serial data image signal, and transmits the serial data image signal obtained by the superimposition in serial format, and
   wherein the image signal receiver separates the serial data image into the imaging signal and second synchronizing signal, and outputs the separated imaging signal and separated second synchronizing signal obtained as parallel data.

2. The imaging apparatus according to claim 1, wherein the first synchronizing signal and second synchronizing signal are asynchronous.

3. The imaging apparatus according to claim 1, wherein a speed of the second synchronizing signal is faster than a speed of the first synchronizing signal.

4. The imaging apparatus according to claim 1, wherein the control of the peripheral circuits by the control unit includes a shutter control and a flash control.

5. The imaging apparatus according to claim 1, wherein the image signal in serial format is an image signal in low voltage differential signaling format.

* * * * *